United States Patent [19]

Yagi et al.

[11] Patent Number: 4,507,537

[45] Date of Patent: Mar. 26, 1985

[54] SILENT DISCHARGE-TYPE LASER DEVICE

[75] Inventors: Shigenori Yagi, Kobe; Shuji Ogawa, Nishinomiya; Masaki Kuzumoto, Amagasaki; Norikazu Tabata, Toyonaka, all of Japan

[73] Assignee: Mitsubishi Denki Kabushiki Kaisha, Tokyo, Japan

[21] Appl. No.: 374,864

[22] Filed: May 4, 1982

[30] Foreign Application Priority Data

May 11, 1981 [JP] Japan ................................ 56-70558

[51] Int. Cl.³ ............................................. B23K 27/00
[52] U.S. Cl. ............................... 219/121 LA; 372/38; 372/85
[58] Field of Search .................. 219/121 LA, 121 LB, 219/121 LG, 121 LN; 372/85, 38, 83, 87

[56] References Cited

U.S. PATENT DOCUMENTS

| | | | |
|---|---|---|---|
| 3,749,976 | 7/1973 | Colyn | 372/38 X |
| 4,154,530 | 5/1979 | Connolly, Jr. et al. | 219/121 LA X |
| 4,247,829 | 1/1981 | Yagi et al. | 331/94 SPE |
| 4,329,662 | 5/1982 | Yagi et al. | 372/38 |

*Primary Examiner*—C. L. Albritton
*Attorney, Agent, or Firm*—Wenderoth, Lind & Ponack

[57] ABSTRACT

A silent discharge-type laser device in which silent discharge is established to produce a laser output by applying a high-frequency voltage across a set of opposing electrodes, at least one of the electrodes being a dielectric electrode; signals which are fed to the power source which produces a high-frequency voltage, used to modify the amplitude of the high-frequency output or to modify the frequency of the high-frequency output. According, the output voltage produced by the high-frequency power source can be increased or decreased at high speeds.

5 Claims, 14 Drawing Figures

SILENT DISCHARGE-TYPE LASER DEVICE

BACKGROUND OF THE INVENTION

The present invention relates to a laser device, and more specifically to a device which is capable of controlling, at high speeds, the intensity of a laser beam responsive to the demands of the side where the laser is used.

The conventional device of this type can be represented by a d-c discharge-type $CO_2$ laser which is shown in FIG. 1, in which reference numeral 1 denotes cathodes, 2 denotes an anode, 3 denotes a discharge space, 5 denotes a gas stream which is sealed at a pressure of about 200 Torr, and which is a mixture of carbon dioxide, nitrogen and helium, 6 denotes a total reflector, 7 denotes a partial reflector, 8 denotes a container, 9 denotes arrows that indicate a laser beam, 10 denotes a lens, 11 denotes a metal plate that is to be processed, 20 denotes a d-c power supply, and 21 denotes stabilizing resistors. The cathodes 1 assume the form of a needle and a plurality thereof are arrayed in the direction of optical axis. The stabilizing resistors 21 are connected to each of the cathodes 1.

The operation will be explained below.

A d-c discharge is established between the cathodes 1 and the anode 2 so as to excite the laser gas. A resonator is constituted by the partial reflector 7 and the total reflector 6, and about 10% of the energy produced by the electric discharge is emitted out of the container 8 as the laser beam 9. The metal plate 11 is irradiated with the laser beam 9 which is focussed by the lens 10. The discharge energy is supplied from the d-c power supply 20 the stabilizing resistors 21 which are provided to prevent the discharge from being converted into an arc discharge in the discharge space 3.

With the conventional device constructed as mentioned above, it was difficult to change the laser outputs at high speed because of the reasons mentioned below.

From the standpoint of the electric circuit, the stability of the d-c discharge is maintained by the stabilizing resistors 21. From the physical standpoint, the stability of the d-c discharge is maintained by an electron stream which is continuously emitted by the function of locally intense electric field of the cathode drop which is automatically formed in the vicinity of the cathodes 1. The cathode drop will be stably formed within a time period of 1 to 10 msec. In the conventional device, if an attempt was made to change the energy of discharge within a time period which was shorter than 10 msec., the discharge tended to be locally converted into an arc discharge, causing the performance of the laser device to be deteriorated. Therefore, it was extremely difficult to control at high speeds the laser output by changing the energy of discharge.

Consequently, the conventional device has generally been used as a continuously operated oscillator.

FIG. 2 schematically illustrates an example when the metal plate 11 is cut by moving it in the direction x and y at an equal speed (2 meters per minute) while being irradiated with the laser beam 9 focussed by the lens 10. In FIG. 2, a folded portion B is poorly cut compared with the straight cut portions A. This is because of the fact that the metal plate 11 is stopped for a brief period of time at the folded portion B and the laser energy is injected thereto in large amounts. To avoid this inconvenience, the laser output must be attenuated for a short period of time (for example, 5 msec.) which is required for changing the direction at a position of the folded portion B. To momentarily reduce the laser output with the conventional device, however, involves great difficulty from the standpoint of maintaining discharge stability, as mentioned above.

With the conventional laser device, as mentioned above, therefore, it was difficult to control the laser output at high speed. Accordingly, the laser device could not be satisfactorily adapted for the purpose of machining workpieces.

SUMMARY OF THE INVENTION

According to the present invention, a silent discharge is employed instead of the traditionally used d-c discharge to excite the laser beam, and the means for applying the voltage is improved.

Namely, in the laser device of the present invention, a high-frequency voltage is applied across the electrodes, at least either one of the electrodes being a dielectric electrode, to establish a silent discharge which excites the laser beam, and a means is provided to increase or decrease the high-frequency voltage applied across the electrodes or to increase or decrease the frequency such that the laser output can be increased or decreased. Depending upon the requirement for using the laser beam, the output can be controlled at high speeds, presenting great practicable effects.

BRIEF DESCRIPTION OF THE DRAWINGS

FIGS. 6(a)–(d) illustrate the operation of the embodiment of the present invention, in which FIG. 6(a) shows a signal waveform; FIG. 6(b) shows waveforms of a high-frequency voltage which is applied, FIG. 6(c) shows the amount of discharge energy per cycle of the high-frequency voltage which is applied, and FIG. 6(d) shows the characteristics of the laser output;

FIGS. 8(a)–(b) illustrate another embodiment of the present invention, in which FIG. 8(a) illustrates signal waveforms and FIG. 8(b) illustrates waveforms of laser output.

DESCRIPTION OF THE PREFERRED EMBODIMENTS

Figure 3:
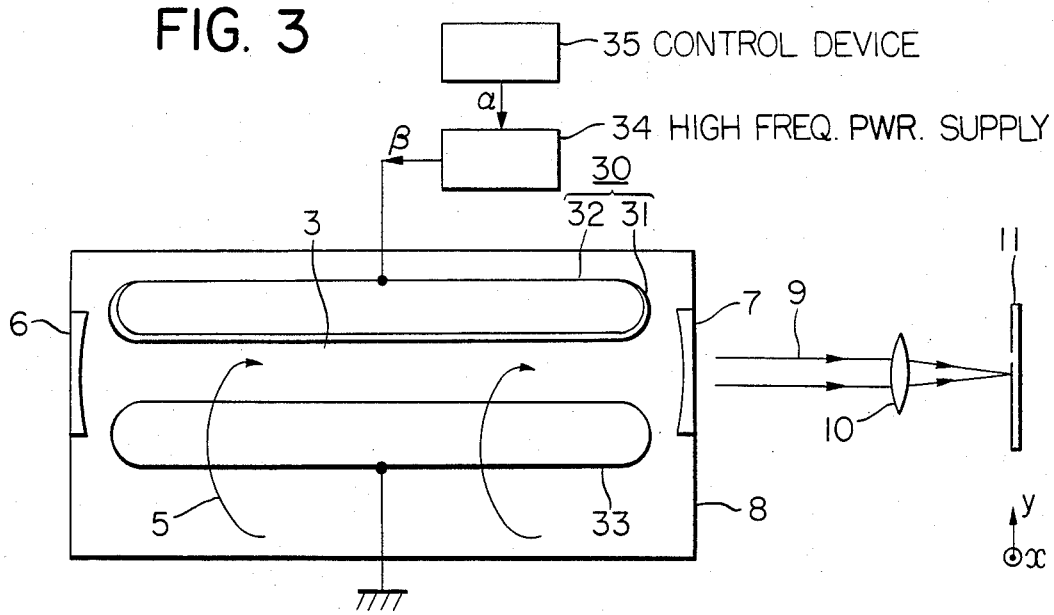
FIG. 3 is a diagram showing the setup according to an embodiment of the present invention.

An embodiment of the invention will be described below. In FIG. 3, reference numeral 30 denotes a dielectric electrode which consists of a metal plate 32 having a discharge surface which is coated with a dielectric material 31, reference numeral 33 denotes a metal electrode, 34 denotes a high-frequency power supply, and 35 denotes a control device which controls the output voltage of the high-frequency power supply 34 and which is responsive to instruction signals which have been stored beforehand in relation to the processing positions.

Figure 3A:
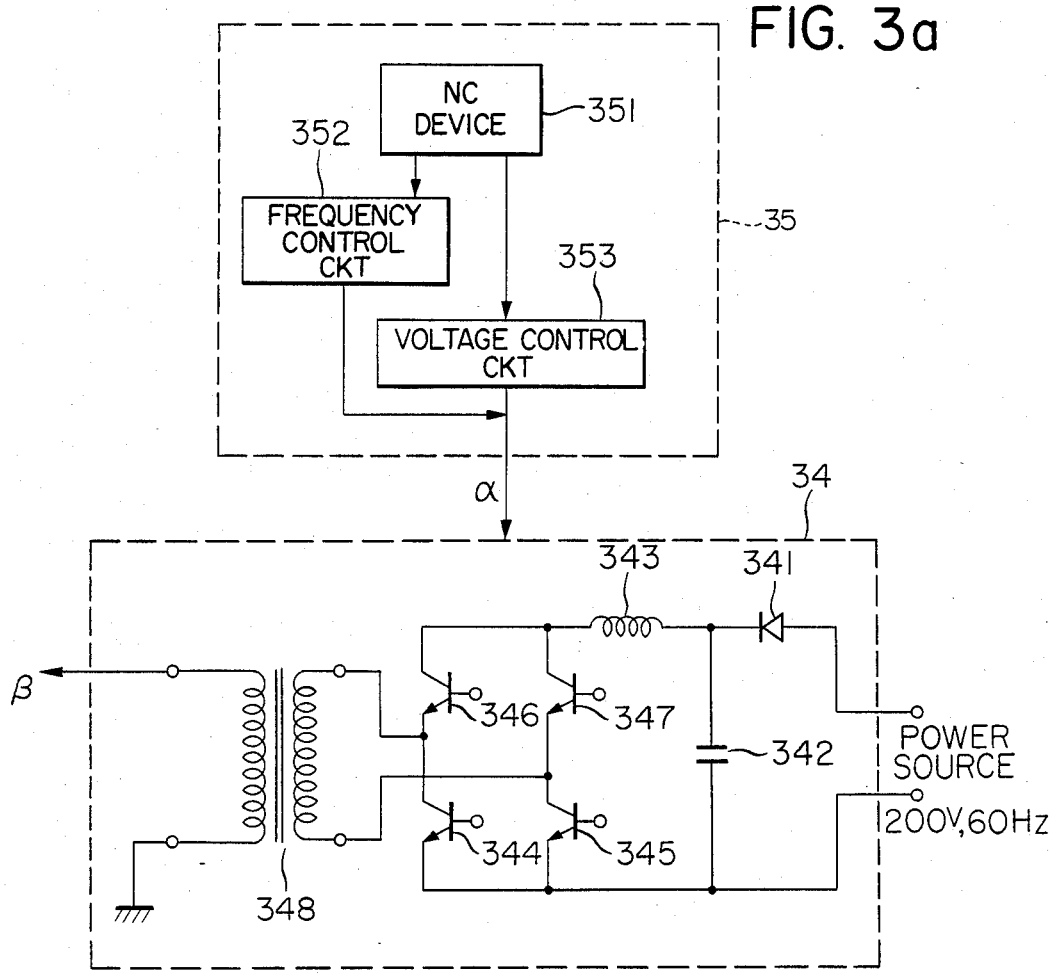
FIG. 3a is a diagram showing part of the electric circuits according to the embodiment of the present invention.

Setup of the high-frequency power supply 34 and the control device 35 will be explained below in conjunction with FIG. 3a. The high-frequency power supply 34 is connected to an a-c power source of 200 volts, 60 Hz. The alternating current is converted into a direct current through a diode 341, a capacitor 342 and a reactor 343, and the frequency is increased by a multiplicity of transistors 344, 345, 346, 347. The voltage is then boosted by a high-frequency transformer 348 to produce an output $\beta$.

On the other hand, the control device 35 has an NC device 351 which supplies signals to a frequency-control circuit 352 and a voltage-control circuit 353 and which controls relative positions of the workpiece 11 and the laser beam 9, and controls the moving speeds. Output signals of the NC device 351 are supplied to the frequency-control circuit 352 and/or the voltage-control circuit 353, so as to control the frequency and/or so as to control the voltage of the transistor-controlled signals. Output signals $\alpha$ of the control device 35 are fed to the transistors 344, 345, 346 and 347. The frequency-control circuit 352 changes the turn-on and -off speeds of the transistors 344, 345, 346 and 347, so as to thereby change the frequency.

Figure 4:
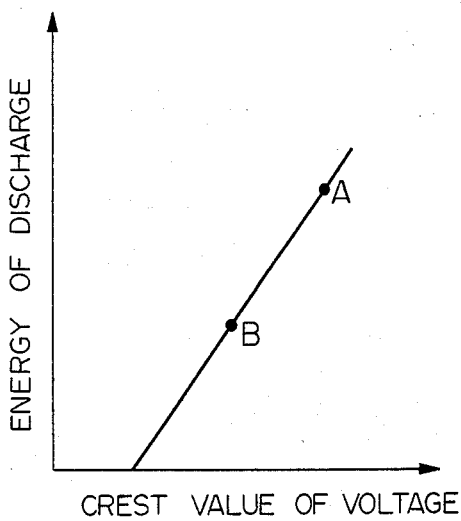
FIG. 4 is a diagram which is related to the operation principle of the present invention, and which shows the relationship between the discharge energy of one cycle and the crest value of the voltage.

The voltage-control circuit 353 may be a conventional pulse width modulation circuit which controls the duty cycle of the transistors 344–347 so as to thereby change the amplitude of the high-frequency voltage. A silent discharge is established in the discharge space 3. In the silent discharge which takes place between the dielectric electrode 30 and the metal electrode 33, there exists a nearly linear relationship between a crest value of the voltage applied across the electrodes and the discharge energy of one cycle, as shown in FIG. 4. The energy of discharge is intermittently injected for each cycle, so that the discharge is maintained stably. Therefore, the discharged power depends linearly upon the crest value of voltage, and varies in proportion to the frequency of the power supply.

Figure 5:
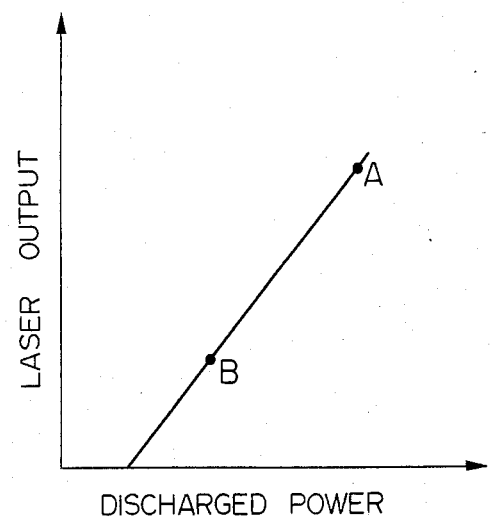
FIG. 5 is a diagram which illustrates a relationship between the laser output and the discharged power.

The relation between the discharged power and the laser output is shown in FIG. 5. That is, the laser output depends linearly upon the discharged power.

The present invention was accomplished based upon the above-mentioned discoveries, and will be described below in detail.

Figure 1:
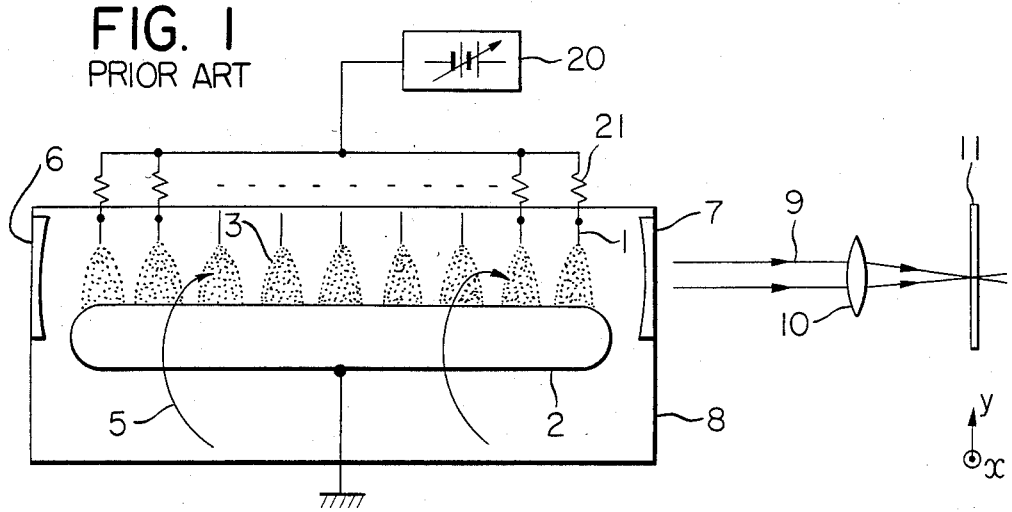
FIG. 1 is a diagram showing the setup of a conventional laser device.
Figure 2:
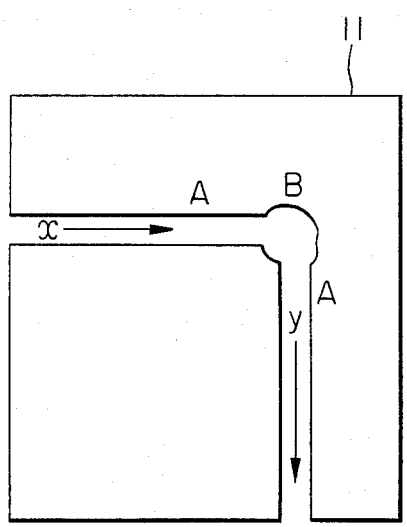
FIG. 2 is a front view showing an example when a workpiece is processed by using the conventional laser device.
Figure 6A:
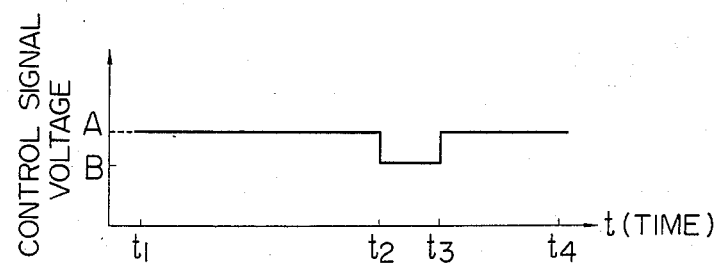
Figure 6B:
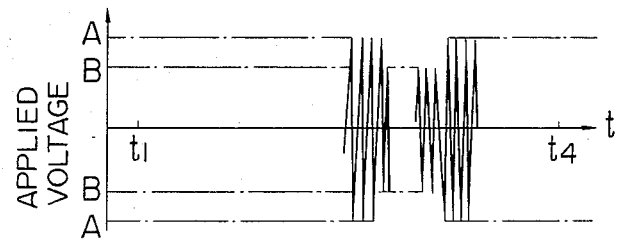
Figure 6C:
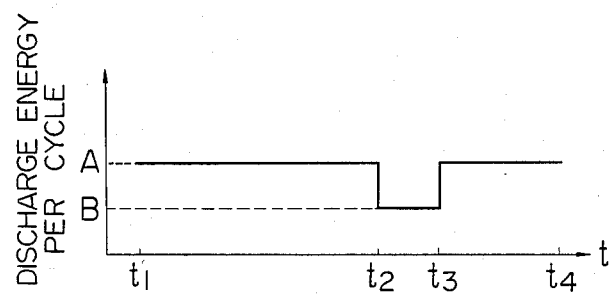
Figure 6D:
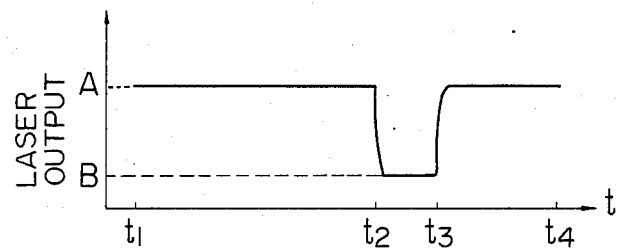

FIGS. 6(a)–(d) illustrate the waveforms for an embodiment of the present invention, in which FIG. 6(a) shows a waveform of a control signal $\alpha$ fed to the high-frequency power supply 34, and illustrates the case when the same processing as that of FIG. 2 is to be carried out. Namely, the metal plate 11 to be processed proceeds in the direction x from time $t_1$ to a time $t_2$, changes its direction by 90° from the time $t_2$ to a time $t_3$, and proceeds in the direction y from the time $t_3$ to a time $t_4$, to finish the processing. FIG. 6(b) illustrates the change in the high-frequency voltage which is applied. The applied voltage decreases over a period of from the time $t_2$ to the time $t_3$, maintaining a form that is amplitude-modulated by the signal $\alpha$ of which the voltage is controlled by the voltage-control circuit 353. FIG. 6(c) shows the change in the discharge energy per cycle of the high-frequency voltage which is applied. The discharge energy decreases correspondingly to the reduction in the applied voltage from the time $t_2$ to the time $t_3$. FIG. 6(d) shows the change in the laser output. Namely, the laser output decreases over a period of from the time $t_2$ to the time $t_3$.

In the silent discharge, the rise or fall of the laser output is as short as about 0.05 msec., and it is possible to obtain laser outputs which follows the waveforms of signal voltage of FIG. 6(a).

Figure 7:
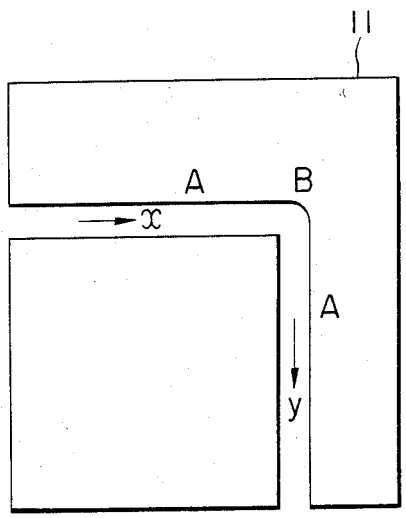
FIG. 7 is a front view showing an example when a workpiece is processed according to the embodiment of the present invention.

The thus processed metal plate 11 has a uniform groove width even in the straight portion A or in the folded portion B, as shown in FIG. 7.

Figure 8A:
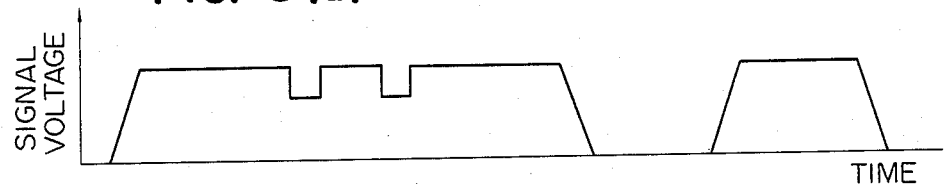
Figure 8B:
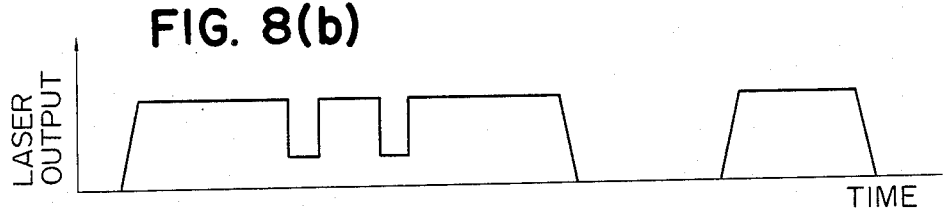
Figure 9:
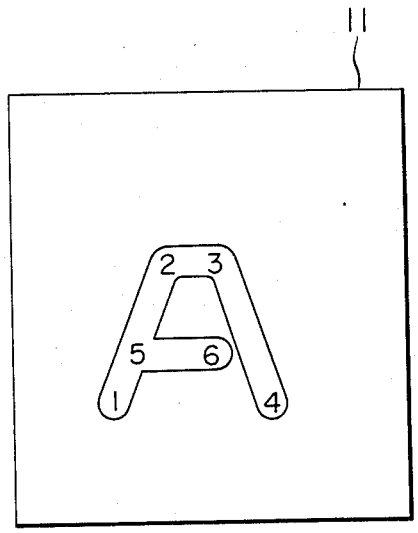
FIG. 9 is a front view showing an example when a workpiece is processed.

There may be a lot of signal voltages and laser outputs that are to be followed in the practical field of applications. With the device of the present invention, it is possible to obtain signal voltages and the corresponding laser outputs as shown in FIGS. 8(a) and 8(b). Therefore, a pattern shown, for example, in FIG. 9 can be formed at high speeds, being controlled in a programmed manner.

In the above-mentioned embodiment, the voltage applied to the electrode was amplitude-modulated in response to the signal voltage. In the silent discharge, however, the electric power also changes in proportion to the frequency. Therefore, the same effect can also be exhibited by modulating the frequency by the frequency-controlled circuit 352. It is further allowable to employ both amplitude modulation and frequency modulation.

What is claimed is:

1. A silent discharge-type laser device comprising:
   a set of opposing electrodes, at least one of them being a dielectric electrode;
   a high-frequency power source which is connected to said set of electrodes and which establishes a silent discharge across said set of electrodes so as to produce a laser beam, said high-frequency power source comprising a DC generating circuit connected to a power source so as to generate a direct current, a high-frequency generating circuit which is connected to an output of said DC generating circuit so as to produce a high-frequency voltage, and a high-frequency transformer which is connected to an output of said high-frequency generating circuit so as to apply a high-frequency voltage across said set of electrodes; and
   a control device which is connected to said high-frequency generating circuit and supplies signals to said high-frequency generating circuit so as to control an output voltage of said high-frequency power source, said control device having at least one of a voltage control circuit for generating signals used to modulate an amplitude of high-frequency output voltage produced by said high-frequency power source and a frequency control circuit for generating signals used to modulate a frequency of said high-frequency output voltage.

2. A silent discharge-type laser device according to claim 1, wherein a workpiece is irradiated by said laser beam and is processed by having its relative position changed with respect to said laser beam, and wherein said control device stores control signals for controlling said high frequency output voltage with respect to said relative position of said workpiece.

3. A silent discharge-type laser device according to claim 2, wherein said control device is further provided with an NC device.

4. A silent discharge-type laser device according to claim 3 wherein said NC device supplies signals to at least one of said frequency control circuit and said voltage control circuit so as to change said high frequency output voltage of said high-frequency power source.

5. A silent discharge-type laser device according to claim 2 wherein said control device stores control signals for reducing said high frequency output voltage of said high-frequency power source at points where said relative position of said workpiece is to be changed.

* * * * *